J. C. DOWD.
VEHICLE SPRING.
APPLICATION FILED DEC. 7, 1920.
1,392,680.  Patented Oct. 4, 1921.
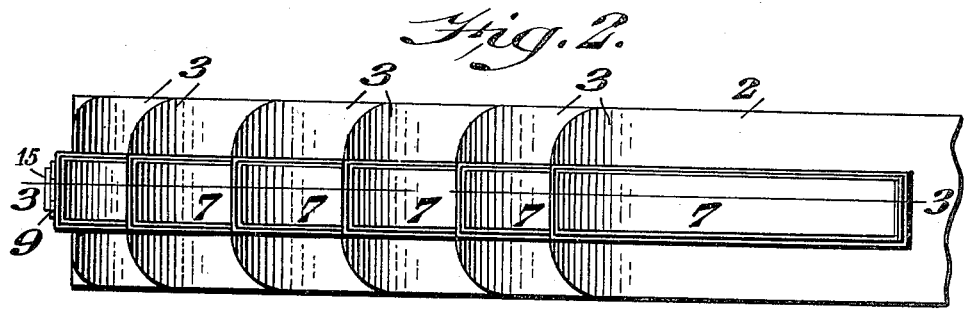
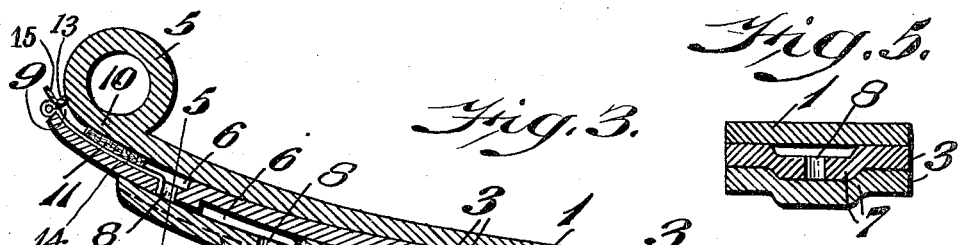
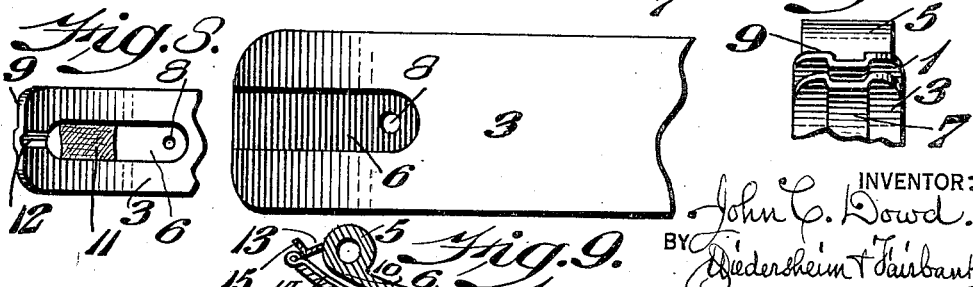

UNITED STATES PATENT OFFICE.

JOHN C. DOWD, OF MERCHANTVILLE, NEW JERSEY.

VEHICLE-SPRING.

1,392,680.　　　　Specification of Letters Patent.　　Patented Oct. 4, 1921.

Application filed December 7, 1920. Serial No. 428,899.

*To all whom it may concern:*

Be it known that I, JOHN C. DOWD, a citizen of the United States, residing at Merchantville, in the county of Camden, State of New Jersey, have invented a new and useful Vehicle-Spring, of which the following is a specification.

My invention consists of a spring more particularly of the form of an elliptical spring for vehicles, the same having novel means for oiling or lubricating the leaves of the spring, novel means for supplying the oil or lubricant to the leaves, and novel means for keeping the leaves in alinement and preventing lateral displacement thereof.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a vehicle spring embodying my invention.

Fig. 2 represents a bottom plan view of a portion thereof on an enlarged scale.

Fig. 3 represents a longitudinal section thereof on line 3—3 Fig. 2.

Fig. 4 represents a plan view of one of the leaves removed.

Fig. 5 represents a transverse section thereof on line 5—5 Fig. 3.

Fig. 6 represents a top plan view of an end portion of the spring.

Fig. 7 represents an end view of a portion thereof.

Fig. 8 represents a top plan view of another embodiment of the invention.

Fig. 9 represents a longitudinal section of another embodiment of the invention.

Similar numerals of reference indicate corresponding parts in the figures.

Referring to the drawings—

1 designates the upper leaf of the spring, 2 the bottom leaf thereof and 3 the intermediate leaves thereof, the several leaves being respectively of different lengths and connected by the bolt 4 or other suitable means.

The upper leaf 1 is provided with the bosses 5 for the purpose of attaching the spring to proper parts of a vehicle as usual. In the upper face of each leaf 3 is the channel 6 which is formed of depressed or downwardly extending walls 7, the said depressed portions extending for a considerable distance along the leaves in the longitudinal direction of the latter, as seen in Figs. 2, 3 and 4, the walls of a leaf entering the channels 6 of the contiguous leaves, the walls thus being nested in each other, as plainly shown in Fig. 5, whereby said leaves are interlocked and so kept in alinement and prevented from shifting in lateral direction, while also preserving the channels 6 in the longitudinal direction of the leaves.

In the base of each channel is the port 8 which thus forms a communication between channels of adjacent leaves whereby when a lubricating oil is poured into the outer ends of the channels 6 of the uppermost leaf 3 it flows down the same and lubricates the joint between the upper leaf 1 and the first leaf of the series of leaves 3. Some of the lubricant flows through the port 8 and enters the channel of the next underneath leaf 3 and so lubricates the joint of the contiguous leaves 3. Then some of the oil flows through the ports 8 into the channels of the other leaves 3 below it and through the respective ports and enters the respective joints of the other leaves and thus all of the leaves are oiled.

Attention is directed to the fact that the walls of the channels 6 of the uppermost leaf 3 are extended outwardly beyond the bottoms of the bosses 5, thus forming the spout-like members 9 which are open at the exterior of the channels to the atmosphere and form inlets for directing the oil to said channels as the primary supply of the oiling device embodying my invention.

The bosses 5 as well known, but without interfering with the spout-like members 9, have their lower portions 10 join the end portions of the upper leaf 1. In the channels 6 of the upper leaf of the series 3 are the pads 11 of fibrous or other material which are adapted to become saturated with the oil and supply the channels with the same in larger volumes without rapidly flowing out of the channel, and also form dust guards for the latter.

In order to prevent the pad 11 from escaping outwardly through the spout-like member the outer terminal thereof is reduced in width as at 12, as shown in Fig. 8, the effect of which is evident.

In order to close the inlet ends of the spout-like members 9 I employ the gates 13 which occupy said ends and are mounted on the outer ends of the arms 14 which enter the channels 6 of the upper leaf 3, the same being of such thickness as not to interfere with the flow of the oil through said channels. The inner ends of said arms are deflected downwardly in somewhat hook form and adapted to enter and engage the walls of the ports 8 in said leaf 3 thus retaining the arm and consequently the gates 13 in position, as apparent on reference to Fig. 9.

On the outer sides of the gates 13 are the finger pieces 15 which are adapted to operate said gates as valves to open the same so that the spout-like members 9 are uncovered and so may be supplied with oil.

Having thus described my invention what I claim as new and desire to secure by Letters Patent, is:—

1. A spring of the character stated formed of a series of leaves with channels in the faces of, and ports through the leaves forming communications between the channels of adjacent leaves, the walls of said channels being nested in adjacent leaves in the longitudinal direction thereof thus interlocking the latter, the nesting portions and communications being at the ends of separate leaves.

2. A spring of the character stated formed of a series of leaves with channels in the faces thereof and coöperating depressed walls interengaging in the longitudinal direction of the leaves, the channels of adjacent leaves being adapted to be in communication, and a supply spout-like member on a leaf on the outer terminal of the channel thereof, the nesting portions and communications being at the ends of separate leaves.

3. A spring of the character stated formed of a series of leaves with nesting channels in the faces thereof and coöperating depressed walls interengaging in the longitudinal direction of the leaves, the channels of adjacent leaves being adapted to be in communication and the nesting portions and communications being at the ends of separate leaves, a pad of absorbent material in the supply channel, the latter having its inlet end reduced in width from that of the remainder of the channel thereby preventing improper escape of said pad from said inlet end.

4. In a spring of the character stated, a leaf having in the face thereof a lubricant receiving channel which latter is extended beyond the bottom of the boss of the leaf forming a supply inlet member, and a gate mounted on said member adapted to close said channel.

5. In a spring of the character stated, a leaf having in the face thereof a lubricant receiving channel which latter is extended beyond the bottom of the boss of the leaf forming a supply inlet member, and a gate mounted on said member adapted to close said channel, said gate being provided with a finger piece for operating the same.

6. In a spring of the character stated, a leaf provided with a boss, an adjacent leaf with an interposed channel having a spout forming an inlet of reduced width, a gate for said spout, and an arm carrying said gate and extending into said channel.

JOHN C. DOWD.

Witnesses:
JOHN A. WIEDERSHEIM,
N. BUSSINGER.